Dec. 18, 1951 — E. C. SMALL — 2,578,850
SHREDDING ROTOR

Filed April 6, 1949 — 2 SHEETS—SHEET 1

INVENTOR.
Elmer C. Small
BY
ATTORNEY.

Dec. 18, 1951     E. C. SMALL     2,578,850
SHREDDING ROTOR
Filed April 6, 1949     2 SHEETS—SHEET 2
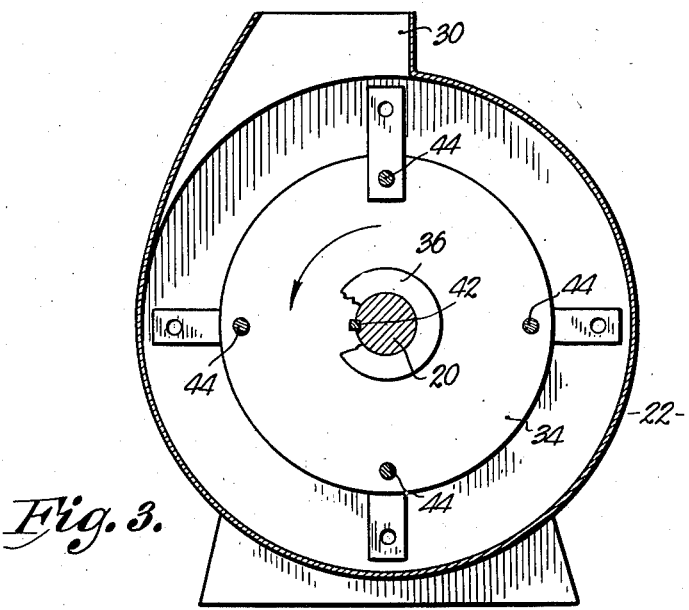
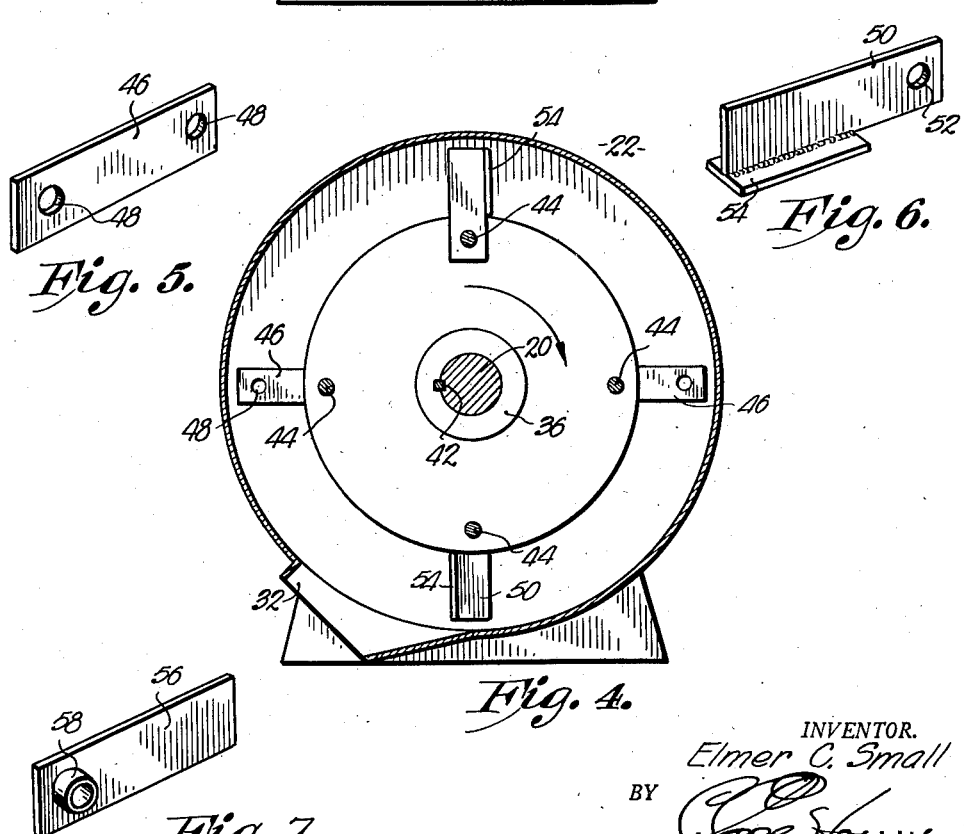
INVENTOR.
Elmer C. Small
BY
ATTORNEY.

UNITED STATES PATENT OFFICE 2,578,850

SHREDDING ROTOR

Elmer C. Small, Neodesha, Kans., assignor, by mesne assignments, to Archer-Daniels Midland Company, a corporation of Delaware Application April 6, 1949, Serial No. 85,769

1 Claim. (Cl. 241—194)

This invention relates to material treating apparatus and particularly to the art of preserving valuable elements of organic materials such as growing crops and by way of example, reference will be had throughout the following specification primarily to such stock food as ground, dehydrated alfalfa, meal or dehydrated alfalfa in pellet form, wherein the carotene and corresponding vitamin A content, is subject to loss during storage.

In the conventional dehydrating processes used for treating alfalfa and like crops, it is necessary to heat the same to a relatively high temperature during the dehydrating process in order to remove the liquid content thereof, and this high heating step is necessary irrespective of the fact that the crop is usually fed into the dehydrator only after the same has been chopped in relatively small particles. The stems of the crop are usually relatively hard and tend to insulate the interior thereof within the dehydrator, thereby requiring high temperatures to remove the liquid therefrom.

This problem results in considerable expense in the process because of the large amount of fuel that is consumed. Furthermore, the equipment that is used, must be replaced or repaired periodically because of the damage that is caused by the extremely high temperatures. Finally, when the finished product emanates from the dehydrator, ready for packaging or storing at a high temperature, the carotene and vitamin A content thereof, is practically entirely lost before ultimate consumption.

It is accordingly, the primary object of the present invention to provide a shredder for treating the chopped crop prior to introduction thereof into the dehydrator, the shredder being formed and operable to slice or pulverize the relatively hard shell or hull of the crop, all to the end that as the same is dehydrated, the interior of each individual stalk, can be more easily heated and the liquid content removed therefrom with much lower temperatures.

Another important object of the present invention is the provision of a shredder for the aforesaid use, having a hollow body through which the crop is directed and having provided therewithin a rotor that has a large number of specially formed hammers operable to act upon the crop by slicing or shredding the hull thereof.

Another important object of the present invention is to provide a shredder wherein a number of differing hammers are provided for acting upon the crop at differing angles, certain of the hammers being formed to create a suction within the cylinder itself, whereby to force the material from the inlet opening to the outlet opening of the device.

Other objects of the present invention are to provide a shredder that has its inlet and outlet openings in opposed offset relationship so that the crop is positively fully treated before it emanates from the shredder; to provide a shredder having means therewithin for maintaining the walls thereof free of the crop by a scraping action thereupon; and to provide a shredder or pulverizer that is inexpensive to manufacture, simple in its operation and not likely to get out of order after long continued use.

Other more minor objects will be made clear or become apparent as the following specification progresses, reference being had to the accompanying drawings, wherein:

Fig. 3 is a transverse, cross-sectional view taken on line III—III of Fig. 2, looking in the direction of the arrows.

Fig. 4 is a transverse, cross-sectional view taken on line IV—IV of Fig. 2, looking in the direction of the arrows.

Fig. 5 is a detailed, perspective view showing one of the hammers forming a part of the rotor.

Fig. 6 is a perspective view of another type of hammer used with and forming a part of the rotor; and Fig. 7 is a perspective view of a third type of hammer for the rotor mechanism.

Figure 2:
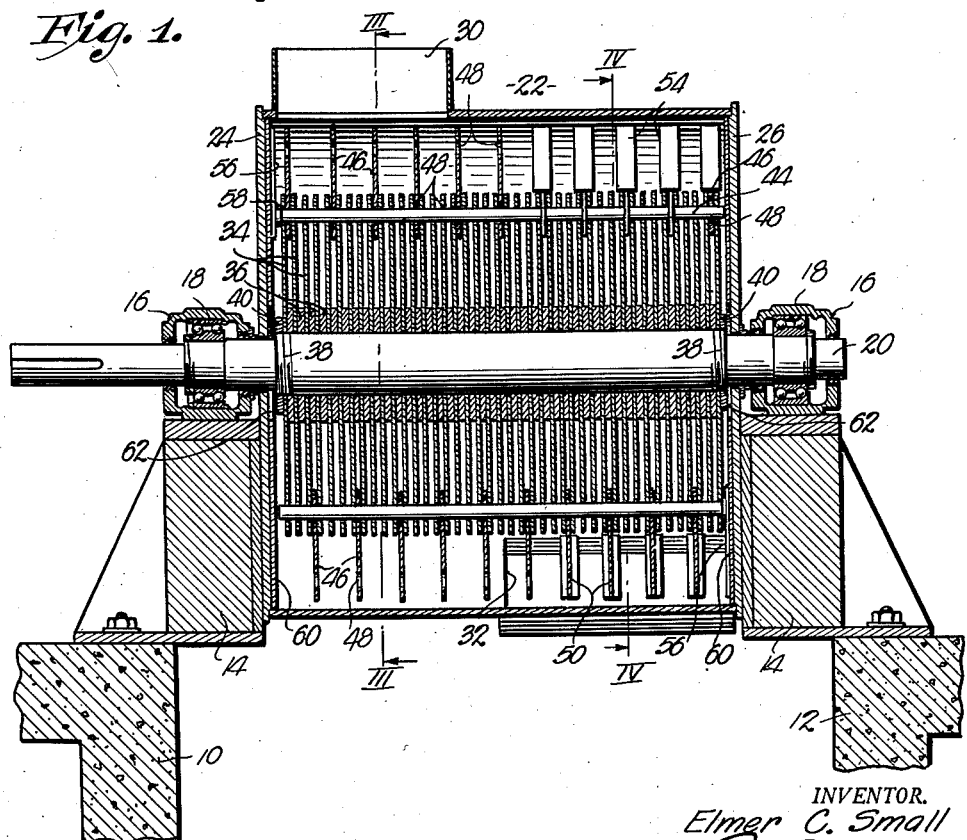
Fig. 2 is a substantially central, vertical cross-sectional view thereof.

In Fig. 2 of the drawings, there is illustrated a pair of spaced apart foundation members 10 and 12, each of which has secured to its uppermost face a support 14.

Figure 1:
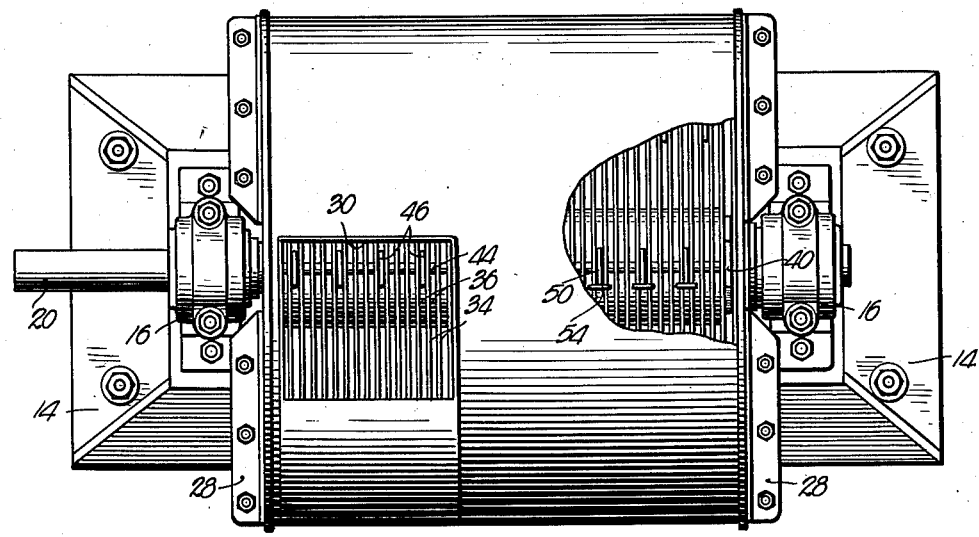
Fig. 1 is a top plan view of a crop shredding and pulverizing mechanism made in accordance with my present invention, parts being broken away to reveal details of construction.

Supports 14 in turn are each provided with a hollow housing 16 that has contained therein a bearing 18. An elongated shaft 20 interconnects and is rotatably mounted within the bearings 18. As shown in Figs. 1 and 2 of the drawings, the shaft 20 extends a distance beyond one of the housings 16 for connection with any suitable prime mover not shown.

A cylinder, broadly designated by the numeral 22, has a pair of spaced apart substantially vertical end walls 24 and 26 respectively, and each of these end walls 24 and 26 has an out-turned flange 28 for securing the cylinder 22 to the spaced supporting members 14. An inlet opening 30 is formed in the top of the cylinder 22 next adjacent the end wall 24 and this inlet opening extends into the interior of cylinder 22 tangentially and in the direction of rotation of the shaft 20 as indicated by the arrows in Fig. 3. An outlet opening 32 is also formed in the housing 22 at the bottom thereof and next adjacent the end wall 26. As shown in Fig. 4 of the drawings, the outlet opening 32 is disposed tangentially relative to the axis of rotation of shaft 20 and away therefrom.

A plurality of circular, centrally perforated discs 34 are threaded upon the shaft 20 within the cylinder 22 and these discs 34 extend entirely from end wall 24 to the end wall 26, as shown in Figs. 1 and 2. Discs 34 are held in spaced apart relationship by spacers 36 that are also threaded upon the shaft 20.

Shaft 20 is provided with a pair of threaded portions 38 adjacent walls 24 and 26 respectively, for receiving nuts 40 that bear tightly against the proximal disc 34 in holding all of the discs 34 and spacers 36 on the shaft 20.

Any suitable locking means may be used such as lock washers (not shown) interposed between nuts 40 and discs 34 to hold the nuts 40 against loosening when the apparatus is placed in use. Furthermore, the discs 34 are preferably keyed to the shaft 20 as at 42 (Fig. 3), to prevent relative rotation between shaft 20 and the discs 34.

A plurality of elongated hammer pins 44 disposed substantially parallel with shaft 20, interconnect the discs 34 adjacent their circumference. These hammer pins 44 rotatably receive a plurality of hammers of the kind illustrated in detail in Figs. 5 to 7 inclusive. Standard hammers of the character shown in Fig. 5 and designated by the numeral 46, constitute an elongated bar having openings 48 near each end thereof, one of which receives a corresponding hammer 44. Openings 48 are provided to the end that the hammers 46 may be reversed if desired, whereby both ends may be utilized before discarding. The standard hammers 46 have their innermost ends disposed between a pair of discs 34 as shown in Figs. 1 and 2 and extend substantially half the entire length of the cylinder 22 adjacent the inlet opening 30. The remaining half of the cylinder 22 adjacent outlet opening 32 is provided with fan-type hammers 50 of the kind shown in Fig. 6.

Hammers 50 are essentially like hammers 46 in that they constitute an elongated bar having an opening 52 permitting rotative mounting thereof on the hammer pins 44. Each hammer 50 has secured thereto by welding or otherwise, and upon one edge thereof adjacent its free end, a flat plate or fan blade 54.

Fan blades 54 extend from the sides of the bar portion of hammers 50 in both directions and terminate at their innermost ends next adjacent the peripheries of discs 34.

Hammers 56 are formed and disposed to operate as scrapers and also comprise an elongated flat bar having an opening at one end thereof for receiving hammer pins 44. Such opening in the hammers 56 is bounded by an outwardly extending perforated boss 58 secured directly to one face thereof. The opening through boss 58 is of sufficient size as to permit threading the same upon the hammer pins 44 for free rotative movement thereon. Each wall 24 and 26 respectively, is provided with a wear plate 60 provided with an opening 62 for clearing shaft 20, these plates 60 being otherwise imperforated to completely cover the innermost face of the corresponding wall 24 or 26.

Plates 60 are preferably formed from a material that will withstand wear more effectively than the walls 24 and 26 and are removably mounted within drum 22 in any suitable manner not shown, to permit replacement as the need arises.

The scraper hammers 56 are disposed next adjacent the wear plates 60 and in such a manner as to maintain the innermost face of plate 60 clear of the material being handled by the apparatus, as the rotor including shaft 20 and its associated parts, rotate within the cylinder 22.

The bosses 58 on the scraper hammers 56 are disposed next adjacent the proximal disc 34 to the end that the scraper hammers 56 are held in a position where they will effectively maintain plates 60 in a clean condition.

It is apparent that the number of hammer pins 44 that are used, as well as the number of hammers 46, 50 and 56, is not particularly important to this invention, but it is contemplated that two hammers 56 be provided for each plate 60 and that the hammers 56 at one end of the rotor, be offset with respect to the hammers 56 at the opposite end of the rotor. It is also to be noted that all of the hammers on one hammer pin 44, are offset with respect to the hammers on the pin 44 next adjacent thereto.

The material enters the inlet opening 30 of the cylinder 22 by force of gravity and immediately is contacted by the hammers 46. The fan-like hammers 50 create a suction within the cylinder 22 from the inlet opening 30 to the outlet opening 32, thereby forcing the material toward the wall 26. Fan blades 54 also serve to force the finished product from the cylinder 22 through the outlet opening 32 and since the same are disposed substantially perpendicular to the hammers 46, the material is positively treated and torn into shreds throughout the circumference and length of each individual stem that enters the cylinder 22.

Through actual use of the shredder forming the subject matter hereof, to tear and further pulverize crops that have previously been cut into relatively short lengths, it has been determined that the temperature of dehydrators can be reduced from approximately 1500° F. to as low as 800° F. The temperature of the finished product consequently is reduced from about 300° F. to 200° F. Also the capacity of the dehydrator is increased tremendously and fuel reduction is approximately one-third. Furthermore, by retention of the carotene and vitamin A content of the finished product through lowered temperatures thereof, the apparatus forming the subject matter hereof has proved to be invaluable.

Having thus described the invention, what is claimed as new and desired to be secured by Letters Patent is:

In a crop shredder, a rotor comprising an elongated shaft; a plurality of parallel plates; spacers between the plates, said spacers and said plates all being threaded on the shaft; a number of pins joining the plates at the peripheries thereof in parallelism with the shaft; and a number of elongated, flat hammers carried by each pin respectively within planes parallel with the plates, said hammers being loosely arranged between proximal plates for free swinging movement on the pins, the hammers for a portion of the length of said rotor and at one end of the latter, each having an elongated, flat blade secured to one longitudinal edge thereof and extending outwardly from the peripheries of the plates, rendering the same T-shaped in cross-section throughout a portion of the lengths thereof.

ELMER C. SMALL.

REFERENCES CITED

The following references are of record in the file of this patent:

UNITED STATES PATENTS

| Number | Name | Date |
|---|---|---|
| 334,098 | Woodburn | Jan. 12, 1886 |
| 529,874 | Parker | Nov. 27, 1894 |
| 561,744 | Witmer | June 9, 1896 |
| 812,122 | Fassett | Feb. 6, 1906 |
| 1,485,416 | Keller | Mar. 4, 1924 |
| 1,492,102 | Nelson | Apr. 29, 1924 |
| 1,591,560 | Prater | July 6, 1926 |
| 1,713,957 | Duvall | May 21, 1929 |
| 1,728,392 | Clement | Sept. 17, 1929 |
| 1,765,309 | O'Neill | June 17, 1930 |
| 1,784,039 | Braun | Dec. 9, 1930 |
| 1,789,583 | Elderkin | Jan. 20, 1931 |
| 1,799,435 | Nelson | Apr. 7, 1931 |
| 1,928,887 | Credell | Oct. 3, 1933 |

FOREIGN PATENTS

| Number | Country | Date |
|---|---|---|
| 239,258 | Switzerland | Jan. 3, 1946 |